(12) United States Patent
Simonovic

(10) Patent No.: US 10,815,427 B2
(45) Date of Patent: Oct. 27, 2020

(54) FIRE-RETARDANT FOR AN INSULATION PRODUCT

(71) Applicants: Branislav R. Simonovic, Belgrade (RS); James R. Adamoli, Houston, TX (US); Nedelijko R. Dzudzelija, Belgrade (RS)

(72) Inventor: Branislav R. Simonovic, Belgrade (RS)

(73) Assignees: Branislav R. Simonovic, Belgrade (YU); James R. Adamoli, Houston, TX (US); Nedelijko R. Dzudzelija, Belgrade (YU)

(*) Notice: Subject to any disclaimer, the term of this patent is extended or adjusted under 35 U.S.C. 154(b) by 245 days.

(21) Appl. No.: 15/816,482

(22) Filed: Nov. 17, 2017

(65) Prior Publication Data

US 2019/0153321 A1 May 23, 2019

(51) Int. Cl.
| | |
|---|---|
| *C09K 21/02* | (2006.01) |
| *C09D 5/18* | (2006.01) |
| *C09D 5/14* | (2006.01) |
| *C09D 5/08* | (2006.01) |
| *D06M 11/155* | (2006.01) |
| *E04B 1/78* | (2006.01) |
| *E04B 1/94* | (2006.01) |
| *C08K 3/016* | (2018.01) |
| *D06M 101/06* | (2006.01) |
| *C08K 3/16* | (2006.01) |
| *C08K 3/22* | (2006.01) |

(52) U.S. Cl.
CPC ............. *C09K 21/02* (2013.01); *C08K 3/016* (2018.01); *C09D 5/084* (2013.01); *C09D 5/14* (2013.01); *C09D 5/18* (2013.01); *D06M 11/155* (2013.01); *E04B 1/78* (2013.01); *E04B 1/94* (2013.01); *E04B 1/941* (2013.01); *C08K 2003/162* (2013.01); *C08K 2003/2206* (2013.01); *D06M 2101/06* (2013.01); *D06M 2200/30* (2013.01)

(58) Field of Classification Search
None
See application file for complete search history.

(56) References Cited

U.S. PATENT DOCUMENTS 3,800,808 A * 4/1974 Reynolds .................. A24D 3/10
131/343
4,173,666 A   11/1979 Quinto
4,182,681 A   1/1980 Gumbert
(Continued)

FOREIGN PATENT DOCUMENTS

| CA | 2853332 A1 | 5/2012 |
| EP | 1238594 B1 | 9/2002 |

(Continued)

OTHER PUBLICATIONS

PCT International Search Report and Written Opinion, dated Mar. 14, 2019, for PCT Application PCT/US2018/060755, Filed Nov. 13, 2018, 12 pages.

*Primary Examiner* — Joseph D Anthony
(74) *Attorney, Agent, or Firm* — International IP Law Group, PLLC

(57) ABSTRACT

A system and method for a fire-retardant insulation product are provided, along with a fire-retardant chemical formulation. An insulation product provided includes cellulose fibers and a fire-retardant chemical formulation. The fire-retardant includes calcium chloride.

11 Claims, 3 Drawing Sheets

(56) References Cited

U.S. PATENT DOCUMENTS

| | | | |
|---|---|---|---|
| 4,184,311 A | 1/1980 | Rood | |
| 4,230,585 A | 10/1980 | Bird et al. | |
| 4,302,488 A | 11/1981 | Lowi, Jr. | |
| 4,468,336 A | 8/1984 | Smith | |
| 4,903,493 A * | 2/1990 | Van Iperen | B65B 63/08 |
| | | | 206/306 |
| 5,170,807 A * | 12/1992 | Kasbo | A24D 1/02 |
| | | | 131/365 |
| 5,372,429 A * | 12/1994 | Beaver, Jr. | B65D 33/2508 |
| | | | 206/524.3 |
| 5,516,580 A | 5/1996 | Frenette et al. | |
| 5,534,301 A | 7/1996 | Shutt | |
| 6,025,027 A * | 2/2000 | Shutt | C09K 21/02 |
| | | | 106/18.13 |
| 10,137,221 B2 * | 11/2018 | Ilan | A61P 43/00 |
| 2002/0062834 A1 * | 5/2002 | Snaidr | A24D 1/02 |
| | | | 131/365 |
| 2002/0139381 A1 | 10/2002 | Peterson et al. | |
| 2004/0168695 A1 * | 9/2004 | Snaidr | A24D 1/02 |
| | | | 131/365 |
| 2006/0263586 A1 | 11/2006 | Lanthier | |
| 2010/0192964 A1 * | 8/2010 | Snaidr | A24D 1/02 |
| | | | 131/365 |
| 2013/0164814 A1 * | 6/2013 | Sarja | D21C 9/1036 |
| | | | 435/184 |
| 2017/0128616 A1 * | 5/2017 | Ilan | A61L 24/001 |

FOREIGN PATENT DOCUMENTS

| | | |
|---|---|---|
| RU | 2277003 C2 | 5/2006 |
| RU | 2012119075 A | 11/2013 |
| RU | 2573468 C2 | 1/2016 |
| WO | 1999/006219 A1 | 2/1999 |
| WO | 2003/077687 A2 | 9/2003 |
| WO | 2004/039911 A1 | 5/2004 |
| WO | 2008/011523 A2 | 1/2008 |
| WO | 2009/124075 A1 | 10/2009 |
| WO | 2010/070002 A1 | 6/2010 |
| WO | 2012/018746 A1 | 2/2012 |
| WO | 2014/116377 A1 | 7/2014 |

* cited by examiner

FIRE-RETARDANT FOR AN INSULATION PRODUCT

FIELD

The present invention relates to an insulating materials processed with a fire-retardant or fire suppressant chemical. The insulation product may include other materials, such as anti-fungal and anti-bacterial chemicals and corrosion inhibitors, among others.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

Using cellulose as insulation was first patented in England in 1893. In the United States, the application of cellulose insulation dates from 1920's, but such insulation was extensively used from the mid-1970s. Since cellulose insulation (CI) is based on recycled paper and cardboard, CI is well recognized as an energy efficient, green product. The addition of flame-retardant chemicals makes the CI more fire-resistant. The primary consumer of CI is the building industry, which has about 10-15% of the residential market. CI is used as thermal insulation and an acoustic barrier.

CI production is performed by shredding recycled paper, such as newsprint, mixed paper, cardboard and the like, and applying additives to improve the resistance of cellulose fibers to ignition at high temperatures. The additives may include different flame-retardant and flame suppressant chemicals. The most common chemicals that have been used include boric acid, borax, and ammonium sulfate. Further chemicals have included gypsum, sodium hydroxide, sodium sulfide, formaldehyde, some resins, gums, or talc, and the like. The fire-retardant chemicals, or mixtures, may be added to cellulosic fibers as solid powder, or by spraying liquid solutions of fire-retardant chemicals.

Estimated consumption of three common chemicals used as fire-retardants during peak production of CI in the mid-1970's, was 45,300 tons of boric acid, 18,300 tons of boron, and 58,000 tons of boric oxide. According to the European Commission (EC) Regulation No. 1272/2008 amended by Commission Regulation (EC) No. 790/2009, boric acid, boric oxide and specific sodium borate salts, including borax, were classified as toxic chemicals, because of potential reproductive toxicity. When these substances are present in preparations or mixtures, specific concentration limits apply before the preparation is classified in this way. For boric acid this limit is 5.5%, which means that only those preparations containing 5.5% or more of free boric acid have to be classified in this way.

Beside the boron and boron compounds, ammonium sulfate is the most usable chemical in CI production. After 2011, compounds have been substituted for boric acid due to the classification as a reproductive toxicant. For example, manufacturers have replaced the boron salts with flame retardants containing ammonium salts. These flame retardants account for about 6% to about 12% of the total mass of the products.

However, an order issued on 21 Jun. 2013 by the European Union prohibits the production, distribution, or sale of cellulose insulation materials containing ammonium salts as additives. Substances containing ammonium salts, used as additives in CI may lead to emission of ammonium gas under certain conditions. The ammonium salts identified in the order include ammonium sulfate (Chemical Abstracts Service (CAS) No. 7783-20-2), ammonium dihydrogen orthophosphate (CAS No. 7722-76-1), and diammonium hydrogen orthophosphate (CAS No. 7783-28-0). Different cofactors may promote ammonia emissions, such as the humidity, the pH of the CI, or temperature, among others.

Accordingly, research into other potential flame retardant systems has continued. Useful systems may be non-toxic and release no problematic gases during storage, use, or when exposed to ignition sources.

SUMMARY

An example described herein provides a method for an insulation product. The insulation product includes cellulose fibers and a fire-retardant chemical formulation. The fire-retardant chemical formulation includes calcium chloride.

The fire-retardant chemical formulation may include calcium carbonate or calcium hydroxide or both. The ratio of calcium carbonate and calcium hydroxide to calcium chloride may be between about 0.1 and about 0. The fire-retardant chemical formulation may include a molecular sieve. The fire-retardant chemical formulation may include a zeolite.

The insulation product may include a biocidal formulation. The biocidal formulation may include butoxylated alcohols having carbon chains that are greater than about 11 carbons, wherein the carbon chains are linear, branched, or both. The insulation product may include a corrosion inhibitor. The corrosion inhibitor may include disodium hydrogen phosphate. The insulation product may include a surfactant.

Another example described herein provides a method for forming an insulation product. The method includes applying a powdered fire-retardant to cellulose fibers, wherein the powdered fire-retardant includes calcium chloride. The method also includes applying a fire-retardant liquid solution to the cellulose fibers, wherein the fire-retardant liquid solution includes calcium chloride.

Calcium carbonate, calcium hydroxide, or both, may be blended with calcium chloride to make the powdered fire-retardant. A zeolite may be blended into the calcium chloride to form the powdered fire-retardant. Clinoptilolite may be blended into the calcium chloride to form the powdered fire-retardant.

The method may include adding a biocide to the fire-retardant solution before applying the fire-retardant solution to the cellulose fibers. The method may include adding a surfactant to the fire-retardant solution before applying the fire-retardant liquid solution to the cellulose fibers. The method may include applying the fire-retardant liquid solution at a ratio to the powdered fire-retardant of about 0.2:9.8 and about 3:7 by weight.

The method may include shredding a cellulose source before adding the powdered fire-retardant. A shredded cellulose source may be milled before adding the fire-retardant liquid solution.

Another example described herein provides a fire-retardant chemical formulation. The fire-retardant chemical formulation includes a dry powder mixture, that includes calcium chloride. The fire-retardant chemical formulation includes a liquid solution that includes calcium chloride, a biocidal formulation, a corrosion inhibitor, and a surfactant.

The liquid solution may include calcium chloride in a range of between about 1 wt. % and about 25 wt. %. The liquid solution may include a biocidal agent in a range of between about 0.01 wt. % and about 0.5 wt. %. The biocidal formulation may include butoxylated alcohols having carbon chains of greater than about 11 carbons, wherein the carbon chains are linear, branched, or both.

The corrosion inhibitor may include disodium hydrogen phosphate. The disodium hydrogen phosphate may be present in a range of between about 0.1 wt. % and about 1 wt. %. A surfactant may be present in a range of between about 0.05 wt. % and about 0.2 wt. %.

The dry powder mixture may include $CaCl_2 \cdot xH_2O$ in a range of between about 2 wt. % and about 90 wt. %, wherein x is 0, 1, 2, 4, or 6, or any combinations thereof. The dry powder mixture may include calcium carbonate or calcium hydroxide or both in a range of between about 2 wt. % and about 60 wt. %. the dry powder mixture may include a zeolite in a range of between about 2 wt. % and about 60 wt. %. A ratio between the liquid solution and the dry powder mixture may be between about 0.2-3:9.8-7.

DESCRIPTION OF THE DRAWINGS

The advantages of the present techniques are better understood by referring to the following detailed description and the attached drawings.

DETAILED DESCRIPTION

Figure 1:
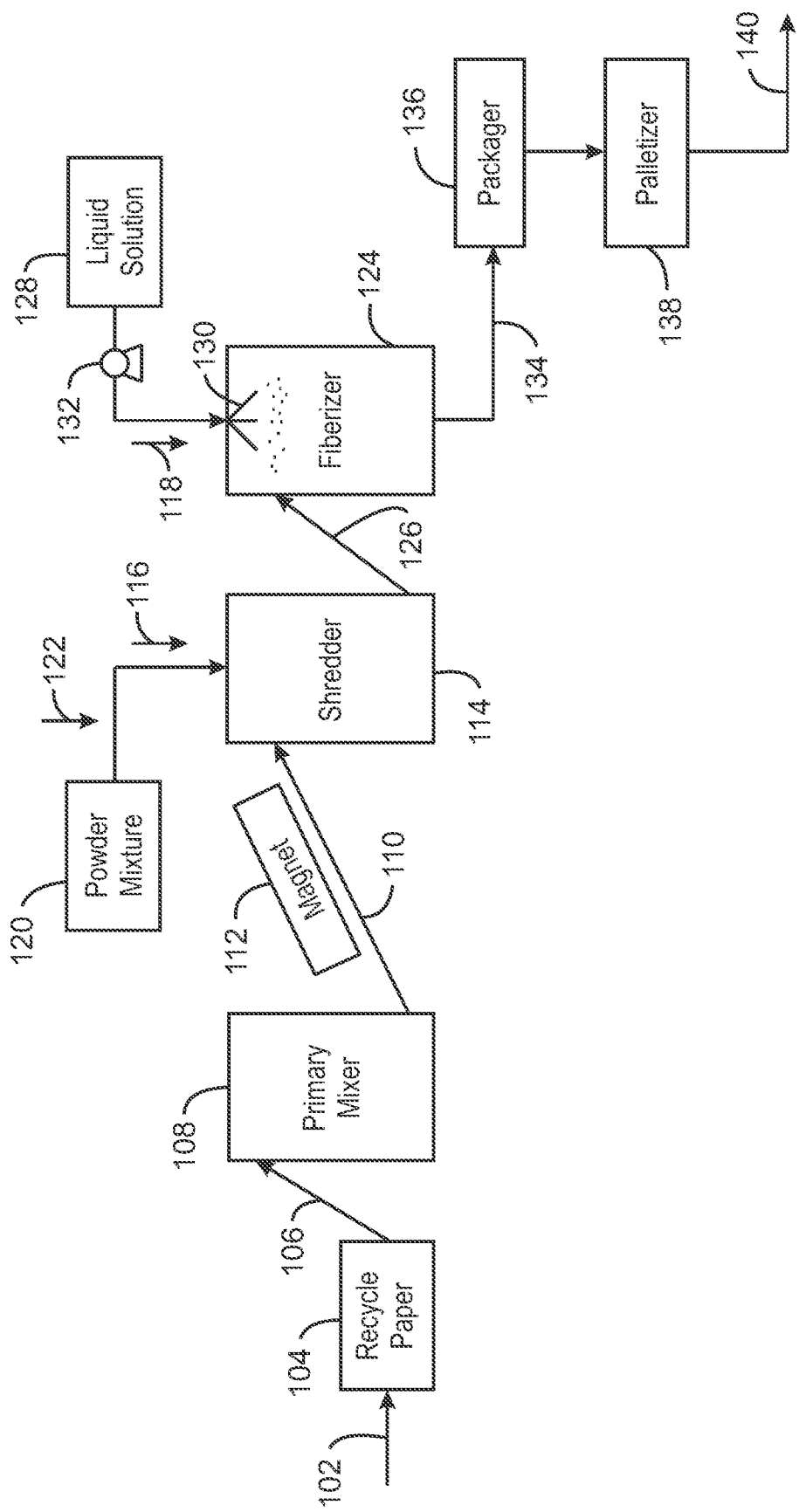
FIG. 1 is a schematic diagram of the production of cellulose insulation, in accordance with examples.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

Most of the present chemicals used for cellulose insulation (CI) production may be somewhat toxic and may have less than optimal effects on the environment. New formulations of chemicals for CI products should provide sufficient fire-retardant or fire suppressant properties, while being resistant to microorganisms and fungi. Further, the additives may provide some resistance to corrosion and be easy for use in the application and manufacturing process.

The American Society for Testing and Materials (ASTM) has issued two standards pertaining to CI. ASTM C 739-17 covers the composition and physical requirements of chemically treated, recycled cellulosic fiber (wood-base) loose-fill type thermal insulation for use in attics or enclosed spaces in housing and other framed-buildings within an ambient temperature range of about −45.6° C. to about 82.2° C. (about −50° F. to about 180° F.) by pneumatic or poring application. The second standard, ASTM C 1149-11, covers the physical properties of self-supported, spray applied cellulosic fibers intended for use as thermal and acoustical insulation, or both. ASTM C 1149-11 covers chemically treated cellulosic materials intended for pneumatic application in temperature range below about 82.2° C. (180° F.). Both standards address density, thermal resistance, smoldering combustion, fungal resistance, corrosion, moisture vapor absorption and odor.

These standards required that all CI must pass flammability and corrosiveness tests. For example, under preceding specifications issued by the Consumer Product Safety Commission (CPSC) standards, CI must have a flame spread rating of from 0 to 25 feet when placed in a 25-foot Steiner tunnel and ignited. In addition, CI must pass a corrosiveness test. For example, corrosion testing of a CI tested may not result in perforations in copper, aluminum, or steel coupons during a 14-day test.

Examples described herein provide a fire-retardant chemical formulation, which may be used in or a CI product for fire retardancy, for example, as determined by the ASTM standards (ASTM C 739-17 and ASTM C 1149-11). The fire-retardant chemical formulation for the CI product may be implemented in existing production facilities, with minimal addition of production steps or production machinery. The fire-retardant chemical formulation may be economical, for example, having lower material costs and operating expenses in comparison to existing chemical formulations for fire retardancy, such as boron salts. Further, the formulation may be considered as non-toxic and environmentally friendly.

The new chemical formulation may be based on calcium compounds, for example, calcium chloride, calcium carbonate, or calcium hydroxide. The calcium chloride may be anhydrous ($CaCl_2$)), or in the form of a hydrate, such as $CaCl_2 \cdot H_2O$, $CaCl_2 \cdot 2H_2O$, $CaCl_2 \cdot 4H_2O$ or $CaCl_2 \cdot 6H_2O$. The use of hydrates may provide some advantages, because the hydrated calcium chloride molecule dehydrates during the heating absorbs energy, lowering the temperature, and releases water vapor which may further inhibit flame spread. Other compounds may be used in addition to, or instead of the calcium chloride, such as calcium hydroxide, calcium carbonate, and zeolites.

The dehydration reaction is shown in the chemical formula of equation 1.

$$CaCl_2 \cdot 6H_2O \rightarrow CaCl_2 \cdot 4H_2O + 2H_2O \rightarrow CaCl_2 \cdot 2H_2O + 4H_2O \rightarrow CaCl_2 + 6H_2O \qquad \text{Eqn. 1}$$

The dehydration of $CaCl_2 \cdot 6H_2O$ to $CaCl_2$) starts already at room temperature and proceeds in three reaction steps. The overall dehydrations are completed at temperatures below 140° C. The obtained overall reaction enthalpies are 1,153 kilojoules/kilogram (kJ/kg) for $CaCl_2 \cdot 4H_2O$, and the total enthalpy for $CaCl_2$) is about 2,630 kJ/kg.

Another calcium compound that may be used in the formulation is calcium carbonate ($CaCO_3$). $CaCO_3$ decomposes at a temperature of about 600° C., according to the chemical formula of equation 2.

$$CaCO_3 \rightarrow CaO + CO_2 \qquad \text{Eqn. 2}$$

The enthalpy of this reaction is about 12,070 KJ/kg, which will absorb a substantial amount of energy during the decomposition process. The decomposition releases $CO_2$, which may further inhibit flammability. These two components when used together have a very high thermal capacity and can absorb very large quantity of heat in case of combustion. A ratio of the calcium chloride to the calcium carbonate may be between about 10 and about 0.

Instead of, or in addition to, the calcium carbonate ($CaCO_3$), another calcium compound may be used, calcium hydroxide ($Ca(OH)_2$), added as lime. The calcium hydroxide may react over time with carbon dioxide ($CO_2$) in the air to produce calcium carbonate, according to the chemical formula of equation 3.

$$Ca(OH)_2 = CaCO_3 + H_2O \quad \text{Eqn. 3}$$

Calcium carbonate may absorb a large amount of energy during decomposition. Further, water produced during the reaction of equation 3 may be retained in the formulation, and may also absorb heat through evaporation.

Other compounds that hold water may be used in addition to, the calcium compounds. For example, a natural or artificial zeolite, such as clinoptilolite, among others, may be used in the formulation. Clinoptilolite is a natural zeolite with a microporous structure that provides a very high surface area. The role of clinoptilolite, or other zeolites, in this formulation is to retain water in the bulk material. The water has a high heat capacity and can absorb a large amount of heat. Further, the desorption of water from the zeolite absorbs a substantial amount of heat. As the water is released in the form of steam, this may provide further fire inhibition by cutting off oxygen from the burning material.

Clinoptilolite has a microporous arrangement of silica and alumina tetrahedra. The chemical formula of clinoptilolite is $(Na,K,Ca)_{2-3}Al_3(Al,Si)_2Si_{13}O_{36} \cdot 12H_2O$. Clinoptilolite is white to white-yellowish crystal powder and can adsorb up to 15% of water. In addition to zeolites, other molecular sieves, formed from Si, Al, and O, and metals such as Ti, Sn, and Zn, may be used to hold water in the mixture.

The use of calcium hydroxide or zeolites instead of, or in addition to, the calcium carbonate decreases the hydroscopic nature of the mixture, allowing its use in a wider range of climates. For example, a mixture of calcium chloride and calcium hydroxide may resist forming a cake or a sludge, even at high humidity levels, such as about 95% to 98% relative humidity. Further, even at low concentrations relative to the calcium chloride, such as 10% to 20% calcium hydroxide, the use of these compounds may allow the powdered fire-retardant mixture to remain dry, for example, in powder form, long enough for application to a cellulosic insulation, for example, around two hours in some blends.

In addition to the calcium compounds, other components may be used, such as biocidal formulations and corrosion inhibitors. The biocidal formulations may be included to inhibit the growth of microorganisms and fungi. Commercial agents, such as butoxylated alcohols comprising carbon chains comprising greater than about 12 carbons, wherein the carbon chains are linear or branched, may be used. One example of these types of compounds, Plurafac® LF 221, is available from BASF Corporation of Ludwigshafen, Germany.

Any number of other biocidal formulations may be used instead of, or in addition to, the butoxylated alcohols, other biocidal formulations may be used. Biocidal formulations that may be used may include wood preservatives such as disodium octaborate tetrahydrate, quaternary ammonium based formulations, silver-based materials, or copper based materials, among many others. As biocidal formulations may be used in low amounts, have low vapor pressure, or both, biocidal formulations may be selected that are compliant with regulations.

A corrosion inhibitor may be added to decrease or prevent corrosion of metal parts, such as pipes, conduits, and wires that may be in contact with the CI in wall or ceiling cavities. For example, disodium hydrogen phosphate ($Na_2HPO_4$), may be added as a corrosion inhibitor. Other corrosion inhibitors, such as organic phosphate salts, calcium nitrate, zinc oxide, or N,N'-dimethylaminoethanol, among others, may also be used.

FIG. 1 is a schematic diagram of a system 100 that may be used to produce a cellulosic insulation, in accordance with an example. It can be noted that this system 100 is merely one example. Fewer units may be used, for example, if a feed 102 has a consistent composition such as recycled newspapers. More units may be used if different types of feed 102 are used, such as newspaper, shredded office paper, cardboard, mixed paper, or other cellulose sources, including fabric.

In this example, a recycled paper storage 104, such as a bin, hopper, warehouse, or other storage, feeds a conveyor 106. The feed 102 may be placed on the conveyor 106 either manually or automatically. The conveyor 106 may empty the feed 102 into a primary mixer 108. In the primary mixer 108, the feed 102 may be ripped apart and declumped, for example, breaking stacks of paper into loose papers. Further, metal, plastic and other contaminants, such as staples, fabric, and paper clips, among others, may be ripped free from the feed 102.

The declumped feed may be fed from the primary mixer 108 onto a second conveyor 110. A magnet 112, or other separator, such as an air jet, or density separator, over the second conveyor 110 may be used to pull metal fragments and other debris from the declumped feed. Once metal scraps are removed, the second conveyor 110 may add the declumped feed to a shredder 114. In the shredder 114, the declumped feed may be torn into small pieces, for example, the pieces may be around 5 cm (2 inches) long. In some examples, such as if the feed 102 is primarily newspaper, the primary mixer 108 may not be present, and the feed 102 may be fed directly to the shredder 114.

The fire-retardant chemical formulation may be added at one or more places in the process, for example, with a dry powder mixture 116 added at one place in the process and a liquid solution 118 added another place in the process. In one example, the dry powder mixture 116 may be blown into the shredder 114 from a powder storage vessel 120 using an air stream 122. The air stream 122 may carry the fine particles of the dry powder mixture 116 and effect agitation of the material in the shredder 114, such as the small pieces and cellulose fibers, providing an efficient coverage of the surface area.

In another example, the dry powder mixture 116 is added to the shredder using a gravity feed device, such as a screw feeder or a manual feed through a hatch. In this example, the shredding devise itself, such as the blades or mill plates, may perform the mixing.

The dry powder mixture 116, or powdered fire-retardant, may include a mixture of calcium chloride and calcium hydroxide or calcium carbonate, or, in some examples, zeolites. A portion of the calcium chloride may be replaced with calcium hydroxide, as described herein. The calcium chloride may be anhydrous, or may include one, two, four, or six waters of hydration, or any combinations thereof, for example, $CaCl_2 \cdot xH_2O$, where x is 0, 1, 2, 4, or 6, or any combinations thereof. The dry powder mixture 116 may include between about 2 wt. % and about 90 wt. % of calcium chloride compounds, such as, the anhydrous or the hydrated calcium chloride. In some examples, the dry powder mixture 116 may include between about 20 wt. % and about 70 wt. % of calcium chloride compounds. The amount of the calcium chloride compounds selected, and the waters of hydration selected, may depend upon the target environment for the cellulose insulation. For example, in a high humidity environment, such as the Gulf Coast of the United States, the amount of calcium chloride compounds may be reduced in the dry powder mixture 116. Further, calcium hydroxide or a zeolite may be added to further decrease water adsorption in these environments. In a low humidity environment, such as the northern Midwest regions of the United States, the amount of calcium chloride compounds may be increased in the dry powder mixture 116. Before mixing with the cellulosic material, chemicals from new chemical formulation in the present invention may be ground into a powder to allow good mixing and adhesion with the cellulosic material. In some examples, the dry powder mixture 116 may be added as a batch into the cellulosic material in the shredder 114 without using an air stream 122. In this example the cellulosic material and the dry powder mixture 116 would be blended by the shredder 114.

The cellulosic material from the shredder 114 may be transferred to a fiberizer 124 through a conveying system 126. The conveying system 126 may include a conveyor belt or may be an air transfer line. In the fiberizer 124, the cellulosic material may be milled to form fine fibers, for example, around 4 mm in length. In some examples, the shredder 114 and the fiberizer 124 may be a single unit that performs both functions. In these examples, the dry powder mixture 116 may be added as the cellulosic material is first shredded, and the liquid solution 118 may be sprayed in after fine fibers are formed.

The liquid solution 118, of the fire-retardant chemical formulation, may be mixed in a liquid solution storage tank 128 then sprayed, for example, through one or more spraying nozzles 130 onto the cellulose fibers. A pump 132 may be used to transfer the liquid solution 118 from the liquid solution storage tank 128 to the spraying nozzles 130. To improve the wetting of cellulosic fibers with the liquid solution 118, a small quantity of a surfactant may be added to the solution. The surfactant may include any number of compounds, such as 4-(d-dodecyl) benzenesulfonate, sodium stearate, ammonium lauryl sulfate, sodium lauryl sulfate, quaternary ammonium salts, benzalkonium chloride, or nonylphenol ethoxylate, among others. The surfactant may be a commercial detergent formulation, such as Zep® detergent, available from Zep Superior Solutions of Atlanta, Ga., USA, Alconox® detergent, available from Alconox Inc. of White Plains, N.Y., USA, or Surfonic N-95, available from Huntsman Chemical, among other commercial detergents. Spraying the liquid solution 118 may help to suppress dust formation from the cellulose fibers and powdered chemicals. The fire-retardant chemical formulation may also reduce dust, for example, up to about 80% over other formulations, up to about 90%, up to about 95%, or higher, as measured by particulates content over the insulation. The dust reduction may prevent the loss of powder chemicals and small cellulose particles, which may also reduce production costs.

The liquid solution 118 may include calcium chloride in a range of between about 1 wt. % and about 25 wt. %. As for the dry powder mixture 116, the amount of calcium chloride in the liquid solution 118 may be adjusted based on the ambient conditions of use for the cellulose insulation. A biocidal formulation, such as the butoxylated alcohol described herein, may be added to the liquid solution in a range of between about 0.01 wt. % and about 0.5 wt. %. The amount of the biocidal formulation added to the cellulose insulation may be increased or decreased, for example, depending on the source of the cellulose fibers or the specific biocidal formulation used. The corrosion inhibitor, such as the disodium hydrogen phosphate described herein, may be added to the liquid solution in a range of between about 0.1 wt. % and about 1 wt. %. The amount of the corrosion inhibitor may be increased or decreased, for example, depending on the humidity of the target environment for the cellulose insulation, the amount of chloride ions that are present in the formulation, or the target location for the cellulose insulation, such as in a location that is not in contact with metal.

As described herein, the dosage of the chemicals in the fire-retardant chemical formulation may be adjusted based on the ambient conditions, such as humidity, temperature, and the like. As the moisture content in the final CI product depends on ambient conditions the ratio between the liquid solution 118 and the dry powder mixture 116 may also be adjusted to obtain the desired density and moisture content of the final CI product. For example, the ratio between the liquid solution 118 and the dry powder mixture 116 may be in a range of from about 0.2 to 9.8 to about 3 to 7. This may correspond to a ratio between the liquid solution 118 and the dry powder mixture 116 of between about 2% and about 30% by weight.

The CI formed in the fiberizer 124 may be transferred through a conveying system 134 to a packager 136. The conveying system 134 may be an air conveying system moving the CI through a pipe. At the packager 136 the CI may be injected into bags and compressed to form bales. The bales may be moved to palletizer 138 and wrapped on pallets that may be shipped out, as indicated by reference number 140.

Figure 2:
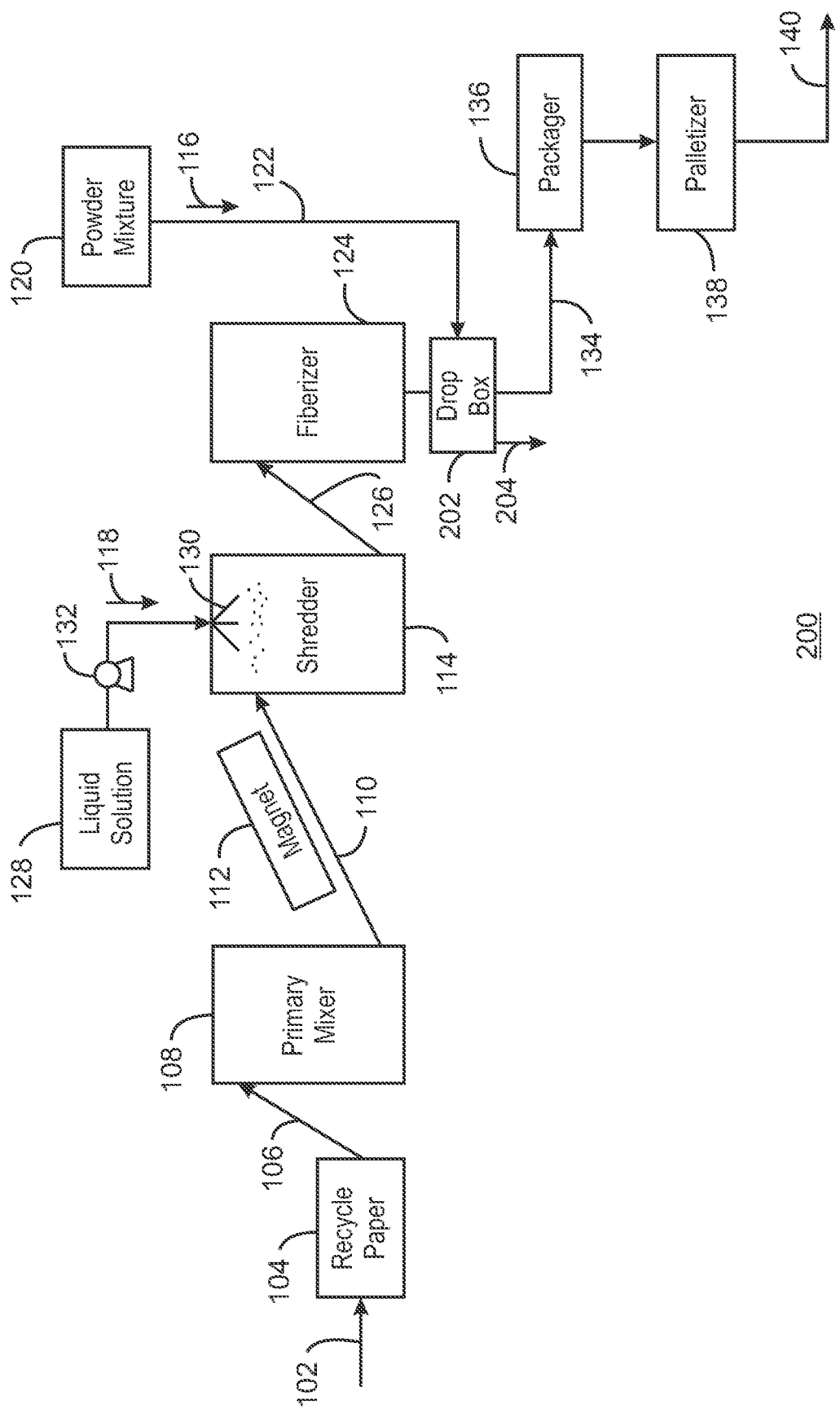
FIG. 2 is a schematic diagram of the production of cellulose insulation, in accordance with examples.

FIG. 2 is schematic diagram of another system 200 that may be used to produce a cellulosic insulation, in accordance with an example. Like numbered items are as described with respect to FIG. 1. The addition points for the dry powder mixture 116 and fire-retardant liquid solution 118 may be changed, as shown in FIG. 2

The liquid solution 118 may be added to the shredder 114 from the liquid solution storage tank 128. For example, the liquid solution 118 may be sprayed into the shredder from the nozzles 130. The liquid solution 118 may be added to vessels associated with the shredder 114, such as a cyclone, drop box, or another vessel feeding into the shredder.

The dry powder mixture 116 may then be added after the fiberizer 124. this may be performed by adding the dry powder mixture 116 to a drop box 202 after the fiberizer 124. The drop box 202 is a density settling device used to remove contaminates 204, such as plastics and metals, before packaging.

Figure 3:
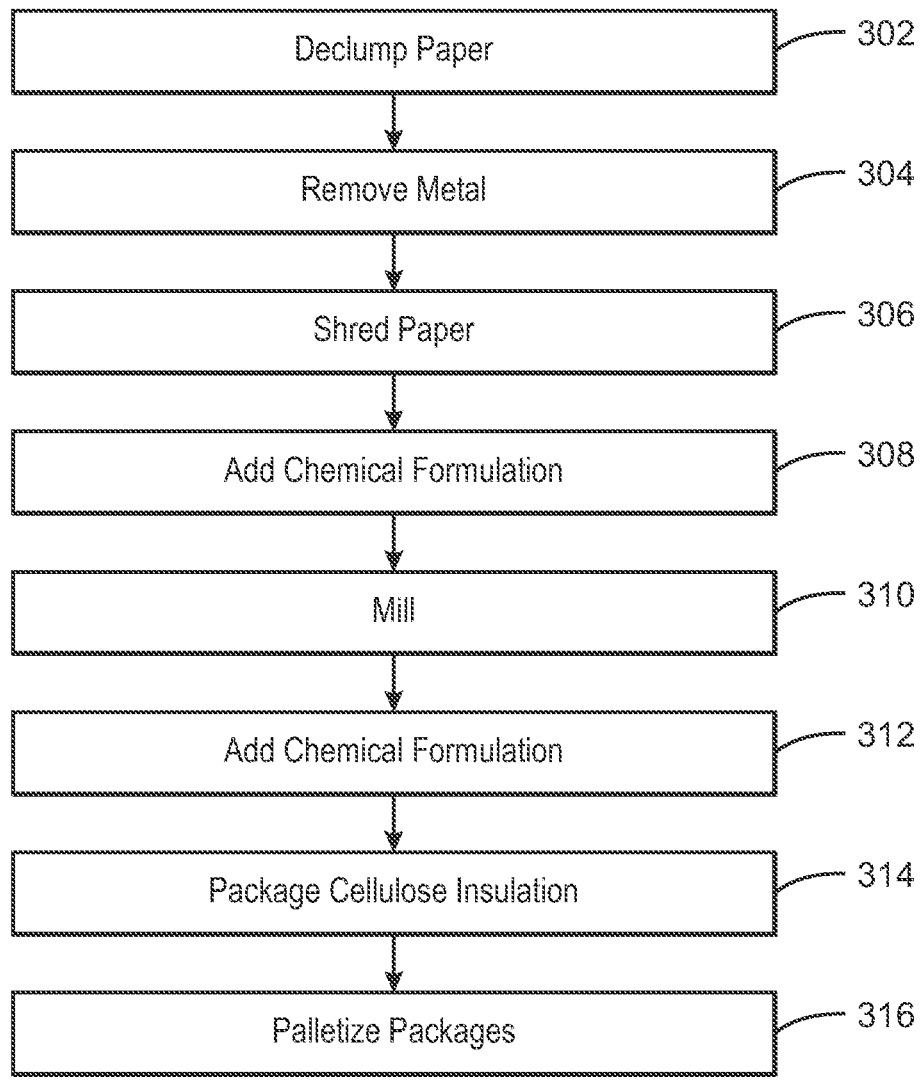
FIG. 3 is method for forming cellulose insulation, in accordance with examples.

FIG. 3 is a block diagram of a method 300 for forming cellulose insulation using the fire-retardant chemical formulation described herein. The method 300 may begin at block 302 when recycled paper is declumped. This may involve breaking stacks and separating adjacent sheets of paper, for example, into individual sheets or crumpled sheets. The paper may be ripped into large fragments, and staples, paper clips, and other metal fragments may be ripped free of larger sheets. At block 304, metal fragments may be removed, for example, using a magnet placed over conveyor belt.

At block 306, the paper may be shredded to form fragments of about 5 cm in a longest dimension. The shredding may be performed by rotating shredder blades. At block 308, a first portion of the fire-retardant chemical formulation may be added to the fragments. The first portion may include a powered fire-retardant, which may include calcium chloride and calcium carbonate or calcium hydroxide in the ratios described for the dry powder mixture 116 of FIG. 1. The dry powder mixture may include zeolites in some examples. In some examples, the first portion may be a liquid fire-retardant solution, which may include the components described for the liquid solution 118 of FIG. 1.

At block 310, the fragments, or shredded cellulose source, may be milled to form cellulose fibers, for example, of about 4 mm in length. The milling may be performed by a hammer mill. At block 312, a second portion of the fire-retardant chemical formulation may be added to the cellulose fibers. The second portion may include a fire-retardant solution that includes calcium chloride. As described with respect to the liquid solution 118, the fire-retardant solution may include a number of other ingredients, such as biocidal agents, corrosion inhibitors, and a surfactant, among others. The fire-retardant solution may be sprayed on the cellulose fibers, providing an even distribution, and helping to suppress dust formation. In some examples, the second portion may include a powered fire-retardant, which may include calcium chloride and calcium carbonate or calcium hydroxide in the ratios described for the dry powder mixture 116 of FIG. 1. The dry powder mixture may include zeolites in some examples.

At block 314, the cellulose insulation is packaged. This may be performed, for example, by compressing the CI into a bale within the bagging machine, forcing the bale into a bag, and then sealing the bag. Depending on the bag type, the ceiling may be a heat seal, a glue seal on a paper bag, or combination thereof. At block 316, the packages may be palletized. This may be performed by stacking bales onto pallets and shrink wrapping the stacks.

Not every block may be performed in every example. If the shredding and milling are performed at the same time, an initial addition of the powdered fire-retardant may be made, and then as the fragments are milled, or shredded, into fibers the fire-retardant solution may be sprayed on the fibers.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. An insulation product, comprising:
shredded cellulose fibers; and
a fire-retardant chemical formulation, comprising calcium chloride;
wherein the insulation product is a loose-fill type thermal insulation to provide thermal insulation for a building.

2. The insulation product of claim 1, wherein the fire-retardant chemical formulation comprises calcium carbonate or calcium hydroxide or both.

3. The insulation product of claim 2, comprising a ratio of calcium carbonate to a combined amount of calcium chloride and calcium hydroxide of between about 0.1 and about 0.

4. The insulation product of claim 1, wherein the fire-retardant chemical formulation comprises a water-retaining zeolite.

5. The insulation product of claim 1, comprising a biocidal formulation.

6. The insulation product of claim 1, comprising a corrosion inhibitor.

7. The insulation product of claim 1, comprising a surfactant.

8. The insulation product of claim 1, wherein the fire-retardant chemical formulation comprises:
a powdered fire-retardant applied to the cellulose fibers, wherein the powdered fire-retardant comprises calcium chloride; and
a fire-retardant solution applied to the cellulose fibers, wherein the fire-retardant solution comprises calcium chloride.

9. The insulation product of claim 8, wherein the powdered fire-retardant comprises calcium carbonate or calcium hydroxide added to the calcium chloride.

10. The insulation product of claim 1, wherein the fire-retardant chemical formulation comprises:
a dry powder mixture, comprising calcium chloride; and
a liquid solution, comprising:
calcium chloride;
a biocidal formulation;
a corrosion inhibitor; and
a surfactant.

11. The insulation product of claim 10, wherein the liquid solution comprises calcium chloride in a range of between about 10 wt. % and about 50 wt. %.

* * * * *